United States Patent Office 3,529,398
Patented Sept. 22, 1970

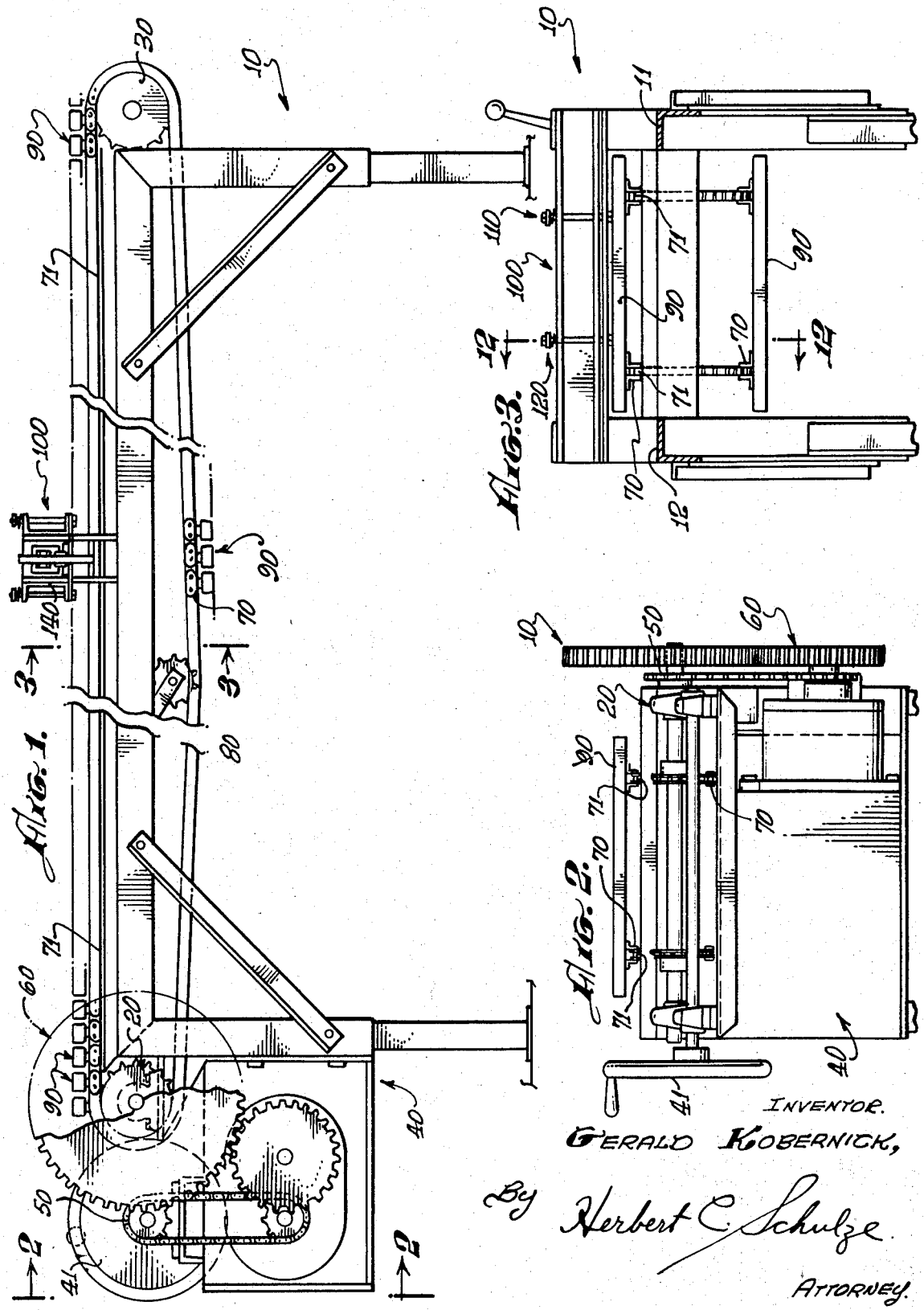

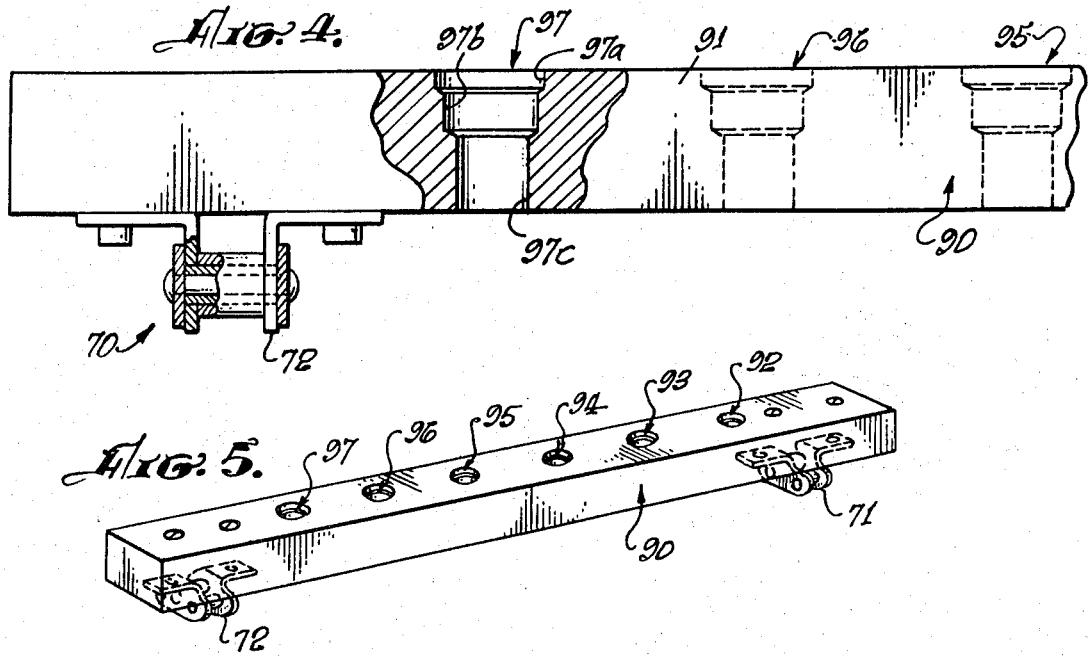
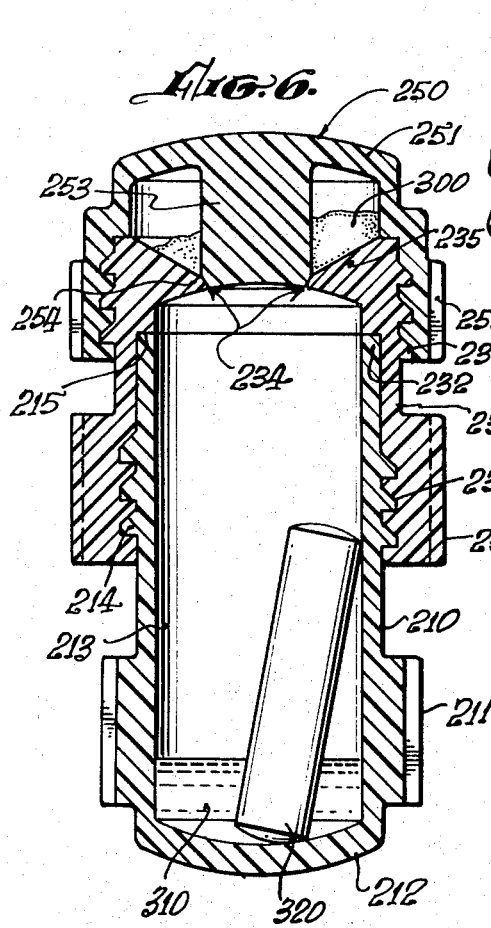
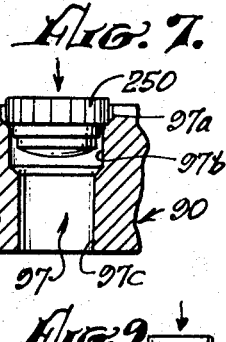
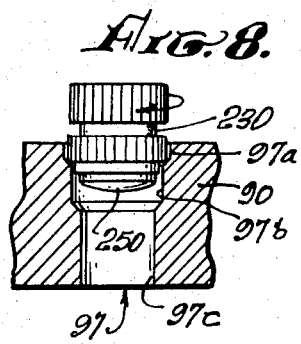
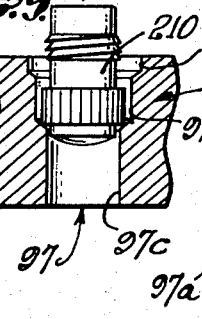
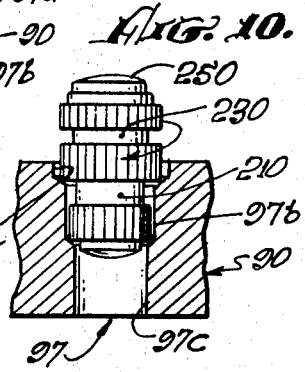

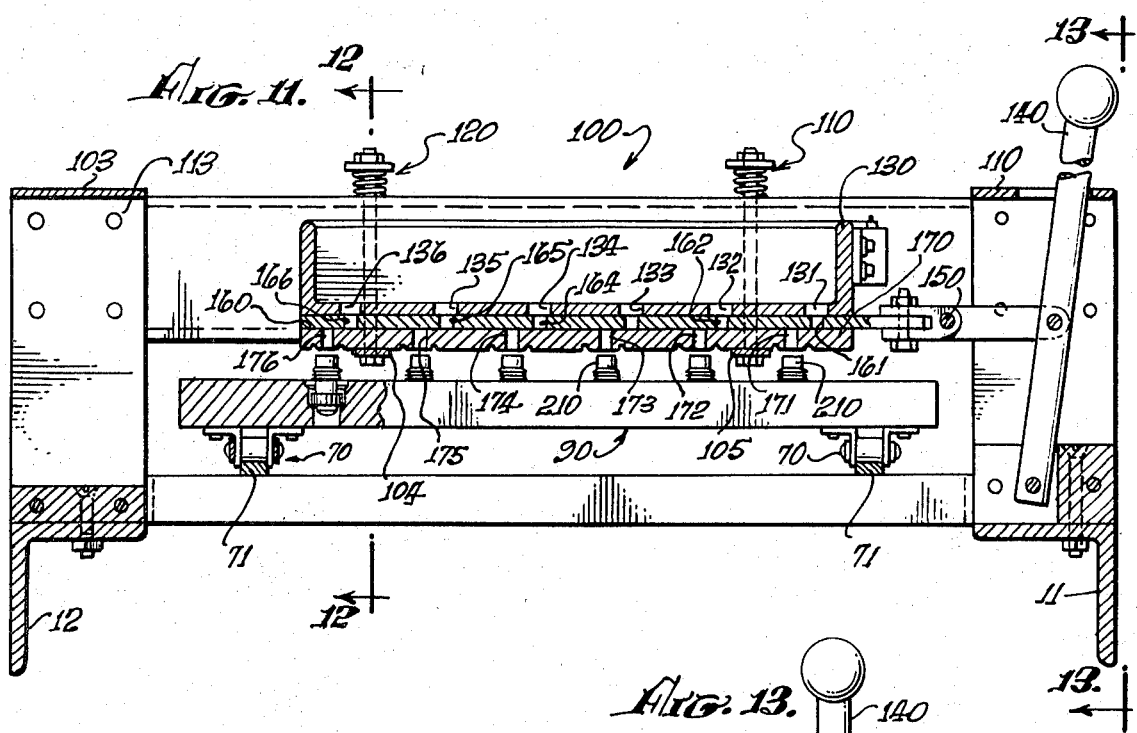

3,529,398
METHOD OF PREPACKAGING DENTAL MATERIALS
Gerald Kobernick, San Diego, Calif., assignor to Koberloy, Inc., a corporation of California
Original application Nov. 1, 1965, Ser. No. 505,946, now Patent No. 3,357,545. Divided and this application Oct. 12, 1967, Ser. No. 674,830
Int. Cl. B65b 3/04
U.S. Cl. 53—37
1 Claim

ABSTRACT OF THE DISCLOSURE

This application relates to a method for prepackaging dental materials used for restoring teeth by dentists. The invention comprises the use of three distinct parts in which one part receives one material to be used in the restoration, another part receives a second material, and a third part fastens those two parts together in such manner that the two materials remain separated by means of a constricted neck and stem arrangement to form a two part field container but which may be easily opened to allow intermixing of the two materials.

CROSS REFERENCE TO RELATED APPLICATIONS

This application is a divisional and restricted application filed after restriction as a divisional application of my copending application, Ser. No. 505,946, filed Nov. 1, 1965, for Dental Materials and Apparatus for Preparing the Same, now Pat. No. 3,357,545. By reason of the provisions of Title 35, Section 120, of the United States Code, this application is entitled to the benefit of the filing date of Nov. 1, 1965.

BACKGROUND OF THE INVENTION

Field of the invention

This invention relates to the field of dental materials and particularly the field of materials which must be divided, or separated, prior to their mixing and in which the use must be immediately after the mixing. It relates to capsules and methods for encapsulating such materials to retain them in the condition indicated prior to use.

Description of the prior art

There have been many past attempts to develop satisfactory apparatus and methods for accomplishing the ends of this invention. In particular, and not necessarily completely limited to, I am familiar with the following patents which relate to this art: U.S. Pats. Nos. 1,774,258; 2,382,978; 2,527,991; 2,835,246; 2,527,992; and my own Pats. No. 3,139,180 and 3,139,181.

All of this prior art is directed to various and sundry capsules and methods, but not anticipating the sealing within one capsule portion, in turn sealed by another capsule portion, of one part of a two part system, together with a second part in a third portion of the capsule sealed to the first two.

SUMMARY

This invention relates generally to dental materials and the like and more particularly to a method and apparatus for packaging and preparing the same.

In the past it has been deemed desirable to pre-package fixed proportions of dental materials and similar materials in which the ingredients must be maintained separately from one another until actual use. Particularly, it has been desired to devise effective methods of packaging such materials in separate containers and there is considerable art in this regard wherein a single container has been divided into two parts or two part containers have been used and the like.

In each such instance it has been found that one of the major problems has been economical filling of such packages, particularly when the packages are quite small such as are necessary for the packaging of individual quantities of dental filling materials for use in individual tooth cavities and the like.

Most devices and methods used involve a two part capsule or container with a valving action of some sort to dispense one material into contact with another.

Because of the difficulty of filling these materials into separated containers and closing them together, I have given this problem considerable attention and experimentation and have devised a new, improved, and unique complete method and system and apparatus for packaging such materials together with a unique container to use in this method and system and apparatus.

Thus it is an important object of this invention to provide a system for maintaining two or more ingredients separate from one another, yet with simple means to bring them into contact for use.

It is a further object of this invention to provide a system for filling different parts of a container for the purpose mentioned above.

It is a further object of this invention to provide a system incorporating a special multiple part container and means to fill the same with more than one material.

It is a further object of this invention to provide a simple and economical method for packaging materials in a multiple portion container as described.

It is still a further object of this invention to provide an apparatus for accomplishing the method mentioned.

The foregoing and other objects and advantages will be clear to those skilled in the art upon reading the following specification in conjunction with the attached drawings.

BRIEF DESCRIPTION OF THE DRAWINGS

FIG. 1 is a partially broken away side elevation of a preferred embodiment of an apparatus for performing the method of this invention;

FIG. 2 is a view on 2—2 on FIG. 1;

FIG. 3 is a partial section through 3—3 of FIG. 1;

FIG. 4 is a partially broken away and partially sectioned view of the portion of the apparatus shown in FIG. 5;

FIG. 5 is a perspective of a container carrying element from the apparatus shown in FIG. 1;

FIG. 6 is a sectionalized view of a preferred embodiment of the container used in the method of this invention, showing materials in place within said container;

FIG. 7 is a sectioned view of the portion shown in section on FIG. 4 with one portion of the container shown in FIG. 6 in place therein;

FIG. 8 is the same view as FIG. 7 showing the addition of an additional portion of the container shown in FIG. 6;

FIG. 9 is the same view as FIG. 7 but with a different portion of the container in place;

FIG. 10 is the same view as FIG. 9 but showing the completed container being assembled therein;

FIG. 11 is a sectionalized view of apparatus 100 shown in place on FIG. 1;

FIG. 12 is a section through 12—12 of FIG. 11;

FIG. 13 is a view on 13—13 of FIG. 11; and

FIG. 14 is a partially broken away enlarged view of the elements 210, 174, 164 and 134 shown in FIG. 11 but in an alternate position for filling materials.

DESCRIPTION OF THE PREFERRED EMBODIMENTS

It will be seen by reference to FIG. 6 that a preferred embodiment of the container used in this invention comprises three basic parts 210, 230 and 250.

It will be seen that in this embodiment there is a bottom section 210 comprising an elongated container 213 open at one end and essentially concave-convex on its closed end 212 with a suitable knurled flange or the like 211 adjacent its closed end.

The lower section has a threaded portion 214 adjacent the open end. It will be observed that a suitable shoulder 215 is provided for sealing against the adjacent portion as will be clear from the drawing and as is hereinafter described.

The intermediate section 230 consists of an elongated cylindrical portion having both its ends open and having a restricted portion 235 between the ends with concave shape towards the restricted portion. It will be observed that one end has threads 231 suitable to engage the threads 214 on the lower portion herebefore described, and it has suitable matching configurations at 232 so that the shoulder 215 of the lower portion as before mentioned will seal directly therein to make a tight seal to prevent materials from leaking out. A knurled portion 236 is provided for easy handling.

The other end of the intermediate portion has threads 233 and has been adapted to engage threads upon the top portion which will be hereinafter described and has suitable configuration 235 to seal with the top portion at 234 as hereinafter described.

The top portion 250 consists of an essentially cup shaped portion, the open end of which is provided with threads suitable to engage threads 233 of the intermediate portion and with suitable configuration to engage the configuration of the upper portion of the intermediate portion to effect a tight seal with portion 235 as is clear from the drawing.

The upper portion also has a stem 253 depending towards its open end from the center of the closed end, which stem is configured so as to form a seal as indicated in the drawing at 234 against the restricted portion of the intermediate section.

It will be noted in FIG. 6 that materials have been shown in place in various portions of the container. As examples, the material in the upper cup shaped portion of the capsule shown in FIG. 6 may be silica powder with a resin reactive agent 300 and the material in the lower portion of the same capsule may be a resin liquid 310 for use in silicate dental fillings. Also, there may be added as desired a mixing pestle 320 so that when the container is shaken vigorously, as is usually the case for mixing such materials, the materials will be pounded together by the action of the pestle.

In filling the containers a mechanism comprising a frame 10 with a pair of roller chains 70 and 71 having blocks 90 of suitable material 91 such as masonite or the like suspended between them as indicated may be used. It will be noted that there are sprockets units 20 and 30 suitaby mounted for moving the chain and a Geneva motion or the like 40 with drive chain 50 and gears 60 for indexing so that the chains 70 and 71 may be stopped at various places as desired. Power may be imparted by hand wheel 41 or a motor.

The top portion 250 of the container or capsule is first fed in the receptacles 92, 93, 94, 95, 96 and 97 in the block by a standard bowl feeder or the like as is well known in the art.

In the illustrations particularly shown in FIGS. 7, 8, 9 and 10 there have been illustrated first in FIG. 7 a typical holding hole 97 in one of the masonite blocks 90, which holding hole has three basic dimensions 97a, 97b and 97c. It will be observed in all of the FIGS. 7, 8 and 9 and 10 that this same hole numbering system has been followed and that the hole 97a is of sufficient diameter that the portion of the capsule or container 250 rests within that part of the hole and is shown there.

It will be further noted that when the lower portion of the capsule part 210 is used, the knurled portion 211 rests within the cavity 97a and the end clears in the portion 97b.

For dental materials the most common materials in present use are silver amalgam fillings and silica fillings. The identical situation illustrated herein may be used for either the amalgam or the silica fillings and, of course, is applicable to many other materials of similar nature which must be kept separated prior to use at which time they react with one another.

In the illustration shown in FIG. 6 silicate material has been placed into the portion 250 of the capsule while the liquid used with this has been placed into the portion 210.

Wherein silver amalgam may be used, mercury will normally be used in the place where the silicate powder is indicated and the silver powder or pellets will be in the place where the silicate liquid is indicated. Basically, the reason for this transference is that it is generally easier to move the mercury from the top portion into the bottom portion for mixing with the silver when the amalgam is used and generally it is easier to move the powder from that portion into the larger chamber when the silicate system is used.

As pointed out, many other materials may be used in this manner when it is desired to keep them separated. Among others, it is extremely important to note that penicillin and sulphur powders of various types and other medical items and many beauty shop materials are frequently desired to be separated from distilled water, hydrogen peroxide and other agents prior to use. By using the method and system herein described in detail, this system and the container used in the system may be adapted to numerous such applications as will be clear to those skilled in the art.

In filling the materials into the various portions of the containers, a filling device is extremely important and I have discovered that the filling device indicated generally by the reference number 100 and in detail in FIGS. 11, 12, 13 and 14 is most desirable and unique for certain of these materials.

One of the materials frequently used and, of course, necessary in the amalgam system, is mercury. Mercury is notoriously difficult to feed in controlled quantities and there are available commercial devices of some complexity for achieving this. I have, however, devised a new and improved and unique feeding system for mercury, which feeding system is also applicable to powder and other items being fed in this overall filling method.

Mercury or a similar material or other materials are fed into the container portions by means of a filler as indicated. This filler comprises a first portion 130 having a trough like storage for the material being fed with a series of holes 131 through 136 as indicated. These holes are larger in diameter than corresponding holes 161 through 166 in a strip of Teflon or the like 160 which slides against the lower surface of the trough 130.

It will be observed that there is a base plate 170 on the other side of the Teflon or the like 160 in which there are holes 170 through 176 corresponding to the holes in the Teflon, but again of larger diameter than the Teflon holes, but preferably of a smaller diameter than the diameter of the opening in the portion of the material container to be filled. It will be clear, of course, that this arrangement when in position as shown in FIG. 11 provides the means for allowing the material from the large filling hole to enter the small hole in the Teflon or the like and thus be assured that this hole is filled. Then the Teflon or the like is shifted until its holes come into alignment with the holes in the base plate as shown in FIG. 14. In this position, all of the material held in the holes in the Teflon can flow freely out and at the same time the opening in container portion 210 being larger than the hole in the base plate the material again can flow freely without being in danger of spillage.

In operations of this system and the apparatus employed in the system numerous top container portions 250 are placed in the holes 92, 93, 94, 95, 96 and 97 in the blocks 90. Each time the hand wheel 41 is turned the blocks are caused to advance a fixed distance through the Geneva mechanism. This fixed distance is the distance between the center lines of the holes on one block to the next block. The alignment point is at the point where the holes in the block are immediately under the holes in the filling mechanism.

The container portion may be placed in the blocks by hand or a bowl feeder as is well known in the art may be employed.

As each block stops under the feeding device 100 the handle 140 is moved to carry the material to be fed into the container portion. The handle 140 is then removed to its original position where the holes in the Teflon strip may once again be filled with the material contained in the trough.

Thereafter, as the capsule parts are advanced beyond the filling, the intermediate portion 230 is placed into the part 250 and screwed together by hand or by power screw driver, as are well known in the art and as indicated in FIG. 8. When this has been done a tight seal has been caused between the parts, both at the shoulder between the two parts and at the place where the stem meets the restricted portion of the intermediate section. This seal as effected is clearly illustrated in FIG. 6.

After being screwed together the top portion 250 joined through the intermediate portion 230 is removed from the block 90 and can be stored until used in the remaining part of the filling operation as will be described below.

Upon the same machine the balance of the operation of completing the filling and assembling of the container may be accomplished.

It may be necessary to substitute a Teflon strip for the original Teflon strip used in the filling device 100, but the only reason for doing this will be to provide a different quantity when it is desired to provide a different quantity of the material next used.

The manner in which the quantity being dispensed is changed is by having a different strip with a different sized set of holes 160, 162, 163, 164, 165 and 166. Obviously, by altering the size of the hole in this Teflon strip or by altering the thickness of the Teflon strip the amount of material may be altered.

The lower portion of the container as specifically indicated at FIG. 9 is fed by hand or by bowl feeders into the holes in the carrying blocks 90. Once again, by alignment under the filling device 100, and by the same means heretofore mentioned, the material being used will be dropped into this portion 210 of the container. After this portion of the container has had the material being dispensed by the filling machine placed in it, the pestles 320, if used, may be then placed by a customary bowl feeder, or by hand.

Thereafter, the assembled combination of the top and intermediate sections will be placed upon the upstanding end of portion 210 and screwed on as indicated in FIG. 10. This may be accomplished by hand or by power screw drivers as is well known in the art.

After this operation has been completed the entire unit may be removed and shipped, stored or used as the case may be.

To describe in general terms the specific operation utilized in different cases, there will be demonstrated three specific applications of this system:

First: A silicate dental filling material may be prepackaged in proper proportions for use by feeding the top portion of the container illustrated in FIG. 6 with silicate powder through the feeding device indicated and assembling the intermediate portion of the capsule indicated in FIG. 6 as specifically heretofore described and sealing the same so that there may be accumulated a supply of portions of the container with the silicate powder sealed so that it cannot escape from the top. This is a decided advantage in the art of filling in that it is not necessary to clam-shell or otherwise handle a capsule under difficult conditions to try to put it together without spilling material.

After these items have been stock-piled the liquid material used with the silicate powder together with a mixing pestle if desired may be placed in the lower portion as will be clear from the drawings, after which the stock-piled top portions with the intermediate portions may be screwed on to the lower portions to effect the complete unit.

Second: A mercury silver amalgam material for dental fillings may be used in the same manner, but in this case it is deemed desirable to place the mercury in the top portion of the capsule in the place where the silicate powder 300 is indicated in FIG. 6 of the drawings. This is accomplished by filling the mercury through the unique feeders I have described and then combining it with the intermediate portion as shown in FIG. 8. At this point because of the very effective seal accomplished no mercury will be spilled even though this portion of the capsule is stock-piled and handled.

Thereafter, silver powder or pellets may be placed in the place of the liquid 310 shown in FIG. 6 and in the operation shown more specifically in FIG. 9. The pestle 320 may be added also and thereafter the entire unit assembled as indicated in FIG. 10.

Third: Medical products may also be used in this identical manner; for example, a water mixed medication which is normally preserved in powder or crystalline form without special treatment, but which will deteriorate rapidly after mixing with water, may be placed in its powder or crystalline form in the upper portion of the container in the place where the silicate powder 300 is indicated in FIG. 6. Utilizing the same filling system as heretofore described, and which will not be repeated, this is sealed off with the intermediate portion and thereafter distilled water or other liquid or other mixing agents may be placed in the lower portion 213 as indicated in FIG. 6. When the entire unit is assembled as heretofore described this item may be kept ready for use without danger of deterioration.

In each of the cases described, after the materials have been packaged as indicated, in order to use them it is only necessary to manually unscrew the top portion 250 from the intermediate portion 230 a partial distance and the material 300 in the upper portion will flow into the lower portion 210. Actually, it is necessary to hold this in such position that gravity will aid the flow of the material and in the event the material is not a free flowing material it may be necessary to tap the item gently after loosening the threads so that the material will be caused to move downward into the lower portion of the container.

Thereafter, the top portion is once again tightened onto the intermediate portion and the stem once again seals so that on mixing all materials will be retained within the basic cavity 213.

Now that all of the material to be mixed have been sealed in the lower portion of the container the container may be placed in a mechanical device such as an amalgamator or the like in the case of dental materials. Amalgamators are customarily used in dental offices for mixing materials and consist of a device to shake a container very rapidly.

Many items, of course, may be shaken briefly by hand such as certain medical items and the like.

After the mixing has been completed, whether by mechanical means or otherwise, the intermediate section is gripped at its knurled portion 236 and the lower portion is gripped at its knurled portion 211 and the two are completely separated. The mixed materials may then be removed from the lower portion 210 and all portions of the container may be disposed of if desired.

It will be seen that a very important function of this system is the closing of a liquid or powder material in the upper portion by means of the unique three part capsule, in which the two upper portions screw together so that at all times the liquid is held in position in the cup by the point of gravity. Thereafter, this combined unit is screwed together with the other portion.

Many materials may be used successfully in this container and system, some of which are mercury and silver for dental purposes: dental silicates; sterile water and various drugs; resins such as polyester, epoxy and the like for dental or similar products; two part epoxy glues and fillers; and numerous other materials wherein it is desired to maintain certain materials ready for immediate use, but separated from one another in a convenient package.

It will be clear to those skilled in the art that many modifications and deviations may be made from the specific details set forth in this specification and that the same may be made without departing from the inventive concepts disclosed herein. The specific embodiment and features mentioned are for illustrative purposes only.

I claim:

1. The method of prepackaging dental materials comprising first and second materials which must be kept separated from one another until used in which the two materials are stored in first and second containers each of which containers is open at one end, and in which the open ends are joined by an intermediate sleeve which cooperates with said containers to maintain the separation of the materials but at the same time to connect the two containers into a container assembly in which materials subsequently may be mixed, comprising:

(A) conveying a plurality of said first containers along a path with their open ends arranged vertically and upwardly;

(B) filling said first containers with said first dental material;

(C) forming closed sub-assemblies by attaching said intermediate sleeve portions to the open ends of said first containers, said sleeves being so attached as to enclose the said material within each of said first containers;

(D) conveying a plurality of said second containers along a path with their open ends being arranged vertically and upwardly;

(E) filling said second containers with said second dental material;

(F) inverting said sub-assemblies, and (G) closing each of said second containers by fastening to the open ends thereof a sleeve portion of said inverted sub-assemblies.

References Cited

UNITED STATES PATENTS

| | | | |
|---|---|---|---|
| 2,495,942 | 1/1950 | Nosik | 220—20.5 X |
| 3,079,022 | 2/1963 | Tompkins | 215—6 |
| 3,255,926 | 6/1966 | Modderno | 53—36 X |

FOREIGN PATENTS 472,284   12/1950   Italy.

TRAVIS T. McGEHEE, Primary Examiner

R. L. SPRUILL, Assistant Examiner